(12) United States Patent
Droemer

(10) Patent No.: US 8,288,706 B2
(45) Date of Patent: Oct. 16, 2012

(54) OPTICAL SENSOR COMPRISING AT LEAST ONE OPTICAL ELEMENT WITH A FREEFORM BOUNDARY SURFACE

(75) Inventor: Joerg Droemer, Bad Urach-Wittlingen (DE)

(73) Assignee: Leuze Electronic GmbH & Co. KG, Owen/Teck (DE)

( * ) Notice: Subject to any disclaimer, the term of this patent is extended or adjusted under 35 U.S.C. 154(b) by 599 days.

(21) Appl. No.: 12/515,837

(22) PCT Filed: Jul. 25, 2007

(86) PCT No.: PCT/EP2007/006593
§ 371 (c)(1),
(2), (4) Date: Oct. 29, 2009

(87) PCT Pub. No.: WO2008/061576
PCT Pub. Date: May 29, 2008

(65) Prior Publication Data
US 2010/0085580 A1      Apr. 8, 2010

(30) Foreign Application Priority Data
Nov. 25, 2006   (DE) .......................... 10 2006 055 743

(51) Int. Cl.
*G06M 7/00*      (2006.01)
(52) U.S. Cl. .................... 250/221; 250/559.38; 356/614
(58) Field of Classification Search .................. 250/221, 250/559.38, 231.13–231.18; 356/614–624
See application file for complete search history.

(56) References Cited

U.S. PATENT DOCUMENTS

| | | | |
|---|---|---|---|
| 6,896,381 B2 * | 5/2005 | Benitez et al. | 359/858 |
| 7,038,195 B2 | 5/2006 | Kida et al. | |
| 2005/0094020 A1 * | 5/2005 | Matsumoto et al. | 348/337 |
| 2006/0214121 A1 * | 9/2006 | Schrey et al. | 250/559.38 |

FOREIGN PATENT DOCUMENTS

| | | |
|---|---|---|
| DE | 20 2005 011847 U1 | 10/2005 |
| DE | 10 2004 028471 A1 | 12/2005 |
| EP | 1 624 322 A1 | 2/2006 |
| EP | 1 666 913 A2 | 6/2006 |
| JP | 2006 012203 A | 1/2006 |

OTHER PUBLICATIONS

International Search Report issued in application PCT/EP2007/006593, dated Dec. 12, 2007.

* cited by examiner

*Primary Examiner* — Francis M Legasse, Jr.
(74) *Attorney, Agent, or Firm* — Venable LLP; Robert Kinberg; Steven J. Schwarz

(57) ABSTRACT

The invention relates to an optical sensor for the detection of objects in a detection range, comprising a transmitter emitting transmitting light beams, a receiver that receives receiving light beams, and an evaluation unit, in which an object determination signal is generated by the evaluation of the receiving signals of the receiver. An optical element, having at least one boundary surface in the form of a free-form surface, is associated with the transmitter and/or the receiver for forming the beams of the transmitting light beams and/or the receiving light beams.

19 Claims, 2 Drawing Sheets

OPTICAL SENSOR COMPRISING AT LEAST ONE OPTICAL ELEMENT WITH A FREEFORM BOUNDARY SURFACE

CROSS REFERENCE TO RELATED APPLICATIONS

This application is a U.S. National Stage of International Application No. PCT/EP2007/006593, filed Jul. 25, 2007, designating the United States. International Application No. PCT/EP2007/006593 further claims priority from German Application No. 10 2006 055 743.3, filed on Nov. 25, 2006, priority of which is also claimed herein. The entire contents of the foregoing International and German applications are incorporated herein by reference.

BACKGROUND

The invention relates to an optical sensor for detecting objects in a detection range.

Optical sensors of this type in particular can be embodied as light scanners for detecting objects within a detection range. These optical sensors are typically provided with a transmitter for emitting transmitting light rays and a receiver for receiving the receiving light rays. A transmitting optic for shaping the transmitted light rays into a beam in this case is installed downstream of the transmitter, while a receiving optic that functions to focus the light rays deflected by an object onto the receiver is installed upstream of the receiver. The transmitting optic and the receiving optic are respectively composed of lenses, which typically have rotation-symmetrical boundary surfaces.

The optical sensors in question can furthermore also be embodied as image-processing sensors. Sensors of this type are provided with a line-type or a matrix-type array of receivers that function as camera. In addition, these sensors can also comprise an illuminating unit, which typically consists of a multiple sensor array.

SUMMARY

It is the object of the present invention to provide an optical sensor having an expanded functionality and improved performance data.

This object is solved with an optical sensor for detecting objects in a detection range, comprising: at least one transmitter adapted to emit transmitting light rays, at least one receiver adapted to receive receiving light rays, an evaluation unit adapted to generate an object detection signal by evaluating the receiving light rays received at the receiver, and at least one optical element assigned to the transmitter and/or the receiver, the at least one optical element adapted to shape the transmitting light rays and/or the receiving light rays into a beam, wherein the at least one optical element comprises at least one freeform boundary surface. Advantageous embodiments and useful modifications of the invention are described in the dependent claims.

The optical sensor according to the invention is used for detecting objects within a detection range and is provided with a transmitter for emitting transmitting light rays, a receiver for the receiving light rays, and an evaluation unit in which an object detection signal is generated through evaluation of the signals received at the receiver. An optical element with at least one boundary surface in the form of a freeform surface is assigned to the transmitter and/or the receiver for shaping the transmitting light rays and/or the receiving light rays into a beam.

One essential advantage of the invention is that with the optical elements comprising boundary surfaces in the form of freeform surfaces, the shaping of a beam with the transmitting and/or the receiving light rays can be adapted precisely to the application-specific requirements of the optical sensor, thus resulting in a high capacity for the optical sensor with regard to the detection safety and the detection sensitivity.

With optical elements embodied as transmitting optics, the illumination of a three-dimensional or a flat detection range can be specifically predetermined by using a suitable embodiment of the freeform surface, which represents a critical precondition to ensure the secure and high-resolution detection of an object within the detection range. Depending on the area of application for the optical sensor, a homogeneous illumination of the detection range can be achieved on the one hand by using a suitable embodiment of the freeform surfaces while, on the other hand, a corresponding embodiment of the freeform surfaces can also be used to generate a predetermined illumination patterns within the detection range. By using such a non-homogeneous illumination of the detection range, specific features of an object located in the detection range can be emphasized purposely to improve the detection ability. Using a non-homogeneous illumination of this type furthermore specifically allows generating markings with an optical method within the detection range, wherein these markings can be recorded by the receiver or the receivers of the optical sensor.

Optical sensors in the form of light scanners or binary optical sensors comprising a single transmitter and a single receiver are in general particularly suitable for use with non-homogeneous illuminating units of this type. With such optical sensors, the signals received by the receiver are typically weighted with a threshold value, which results in generating an object detection signal in the form of a binary switching signal, for which the switching states indicate whether or not an object is located in the detection range. With optical sensors of this type, an object must typically be detected before a background, which in particular can also be a reflector that delimits the detection range. To be able to distinguish an object before a background, the optical sensor operates with polarized transmitting light rays, so that the polarization state of the light impinging on the receiver can be distinguished.

The optical sensor according to the invention no longer necessitates the use of polarized light. Instead, the illumination pattern in the form of optical markings or the like, which is generated by the freeform surfaces of the optical element or elements, is used for the object detection, in particular also for detecting objects before a background. To detect the illumination pattern, the transmitted light rays on the one hand can scan the flat detection range with the aid of a deflection unit. Alternatively, the optical sensor can also be provided with a receiver array with local resolution, which consists of a line-type or matrix-type array of receivers.

Non-homogeneous illuminating systems with optical elements having freeform surfaces are furthermore suitable for use in optical sensors taking the form of image-processing sensors, meaning sensors provided with a camera in the form of a receiver array. Optical sensors of this type are provided with illuminating units that typically comprise several transmitters, wherein these are in turn provided with optical elements having freeform surfaces for shaping the transmitted light rays into a beam. With the aid of these types of illuminating systems, predetermined, three-dimensional illumination structures can be generated purposely for increasing the detection sensitivity. In particular, specific features of objects to be detected can purposely be emphasized with the aid of non-homogeneous illumination. The illumination structures can furthermore be embodied as strip projections in order to obtain three-dimensional image information.

Optical elements installed on the receiving side of the optical sensor according to the invention can in general also be provided with freeform surfaces, so that the receiving light can be directed with control onto the receiver or receivers of the optical sensor, so as to increase its detection sensitivity.

The freeform surfaces of the optical elements for the optical sensor according to the invention in general are areas that follow a continuously differentiable function, wherein these freeform surfaces are not rotation-symmetrical.

A so-called mapping is used as the method for computing a freeform surface. This mapping consists of a grid structure in the plane for the detection range, wherein the individual nodes of the grid are assigned two angular directions for the intensity distribution of the transmitting light rays, meaning of the illuminating system. Since the intensity distribution for the transmitting light rays is known, a clear connection exists between the grid structure that defines the brightness distribution in the plane for the detection range and the radiation intensity distribution in the illuminated plane.

From this, an analytical connection can be derived between the geometry of the freeform surface and the desired illumination distribution in the plane for the detection range, meaning the geometry of the freeform surface can be derived in the form of a differential equation from the brightness distribution in the plane for the detection range.

The geometry of the freeform surfaces extending in two spatial directions x, y is computed with the aid of the following differential equation:

$$d^2/dx^2 f(x,y) + d^2/dy^2 f(x,y) = d/dx\{N_x(x,y,f(x,y))/N_z(x,y,f(x,y))\} - d/dy\{N_y(x,y,f(x,y))/N_z(x,y,f(x,y))\}$$

$N_x$, $N_y$, and $N_z$ in this case form the field of normal for the transmitting light rays, required for refracting the light rays transmitted by the transmitter at the freeform surface in such a way that these arrive at the gird location that is predetermined with the mapping function, in the plane for the detection range.

Optical elements that are provided with freeform surfaces of this type can thus be used to generate precisely determined brightness distributions in a detection range. It is particularly advantageous that such optical elements are considerably more robust than diffractive optical elements and furthermore exhibit smaller chromatic errors.

A further essential advantage is that the optical elements with freeform surfaces can be produced cheaply and efficiently in the form of plastic injection-molded parts.

These optical elements generally can be embodied as light-reflecting elements, in particular mirror elements. However, the optical elements can also be embodied as transmittive elements, for example in the form of lenses.

BRIEF DESCRIPTION OF THE DRAWINGS

The invention is explained in the following with the aid of the drawings, which show in.

DETAILED DESCRIPTION

Figure 1:
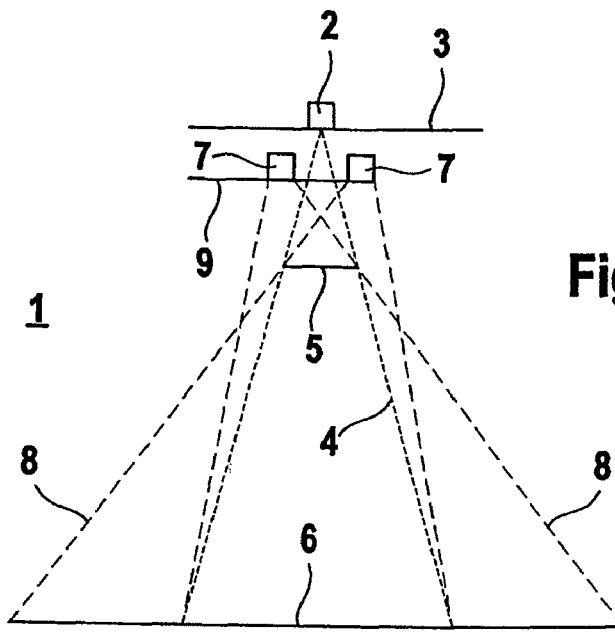
FIG. 1 A schematic representation of the components for an optical sensor.

FIG. 1 shows the optical components for an optical sensor 1 that is embodied as image-processing sensor. The optical sensor 1 comprises a camera 2 with a matrix-type array of receivers and an upstream installed lens which is positioned in a lens plane 3. The matrix-type receiver array can be a CCD (charge coupled device) array or a CMOS (complimentary metal oxide semiconductor) array.

The optical sensor 1 is used to detect objects within a three-dimensional detection range. The dimensions for the detection range are predetermined by the field of vision 4 of the camera 2. In this case, the objects to be detected within the field of vision 4 are located at a distance to the optical sensor 1 that exceeds the position of a first object plane 5 and is shorter than the position of a second object plane 6. The area covered by the field of vision 4 of the camera 2 between the two object planes 5, 6 thus forms the detection range.

The optical sensor 1 furthermore comprises an evaluation unit, not shown herein, in which the image signals generated by the camera 2 are evaluated, meaning the signals received at the receiver array and generated by receiving light rays that are received at the receiver and then conducted to the camera 2.

An object detection signal is generated in the evaluation unit in dependence on the receiving signals. This object detection signal can be an analog signal, which contains general image information or which contains classifications of image information. The object detection signal can furthermore be a binary switching signal, for which the switching states indicate whether or not an object is located in the detection range.

The optical sensor 1 according to FIG. 1 is furthermore provided with additional optical components belonging to an illuminating system 7, which is activated by the evaluation unit. FIG. 1 schematically shows that the components of the illuminating system 7 are arranged outside of the optical axis for the camera 2. As a result of arranging the components of the illuminating system 7 outside of this axis, the transmitting light rays emitted by these components are emitted from above and at an angle in the direction of the detection range. The resulting illuminated areas 8 are larger than the field of vision for the camera 2, so that the complete detection range is illuminated with the illuminating system 7.

The components of the illuminating system 7 in this case are located in an illuminating plane 9 that is located upstream of the lens plane 3 for the camera 2.

To ensure a secure detection of the object within the complete detection range, the illuminating system 7 must meet the critical requirement of uniformly illuminating the detection range. It means that the radiation intensity generated with the illuminating system 7 within the detection range should be homogeneous. The radiation intensity should furthermore be concentrated onto the detection range, meaning the radiation intensity should drop rapidly outside of the detection range.

Figure 2:
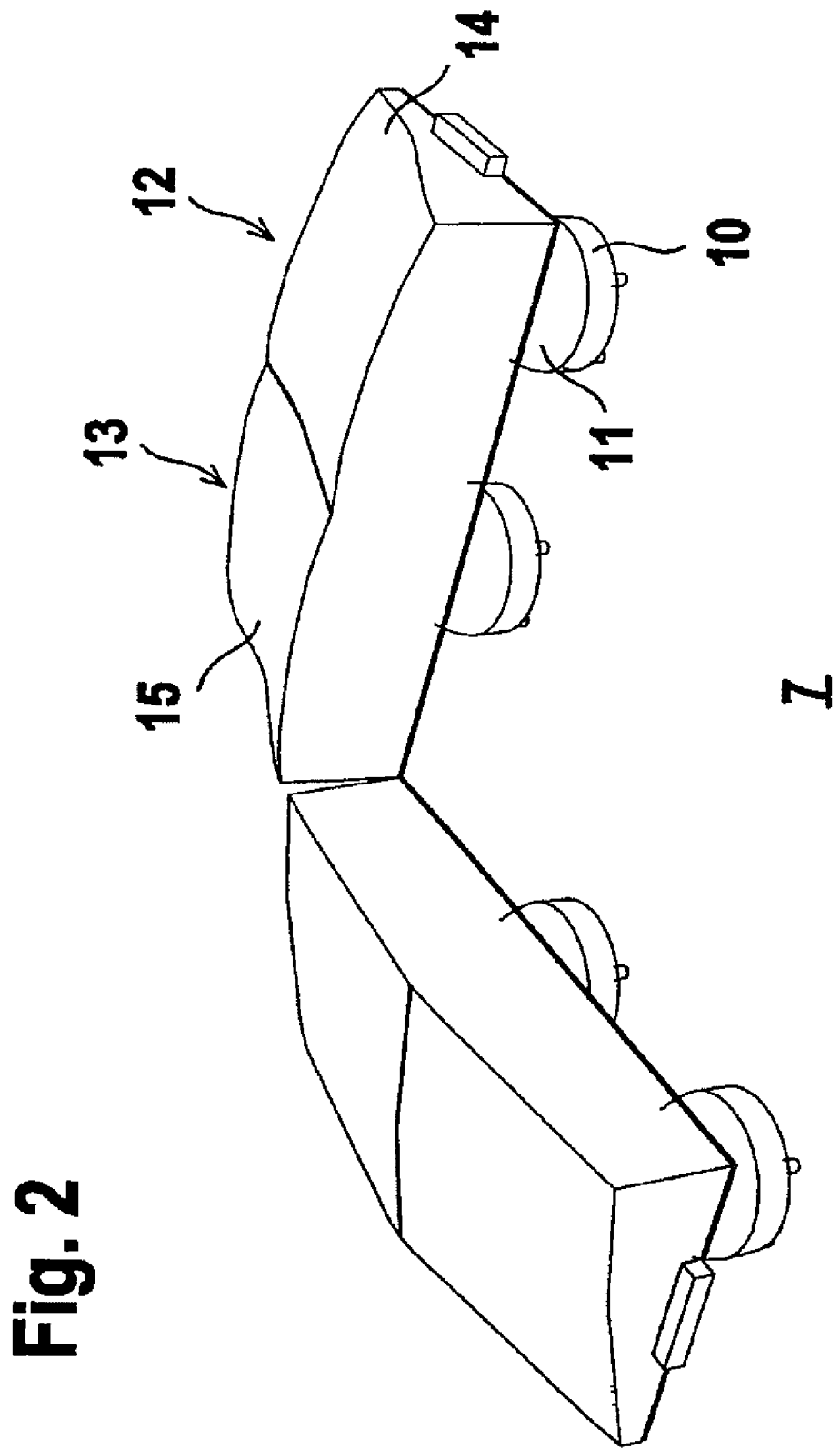
FIG. 2 A perspective representation of the illuminating system for the optical sensor according to FIG. 1.

FIG. 2 schematically shows the configuration of an illuminating system 7 that satisfies these requirements. The illuminating system 7 comprises four identically designed subsystems, rotated by 90° relative to each other, of which two are shown in FIG. 2. These subsystems delimit a central intermediate space behind which the camera 2 is located, as shown in FIG. 1.

Each subsystem is provided with two transmitters 10, with a decoupling lens 11 mounted thereon. The transmitting units embodied in this way have identical designs. The two transmitting units of a subsystem are respectively positioned behind an optical element, embodied as freeform lens 12, 13, for which the boundary surfaces are the freeform surfaces 14, 15. The two freeform lenses 12, 13 of a subsystem form a double lens and are embodied mirror-symmetrical to each other. The freeform lenses 12, 13 of the individual subsystems are embodied identical.

Figure 3:
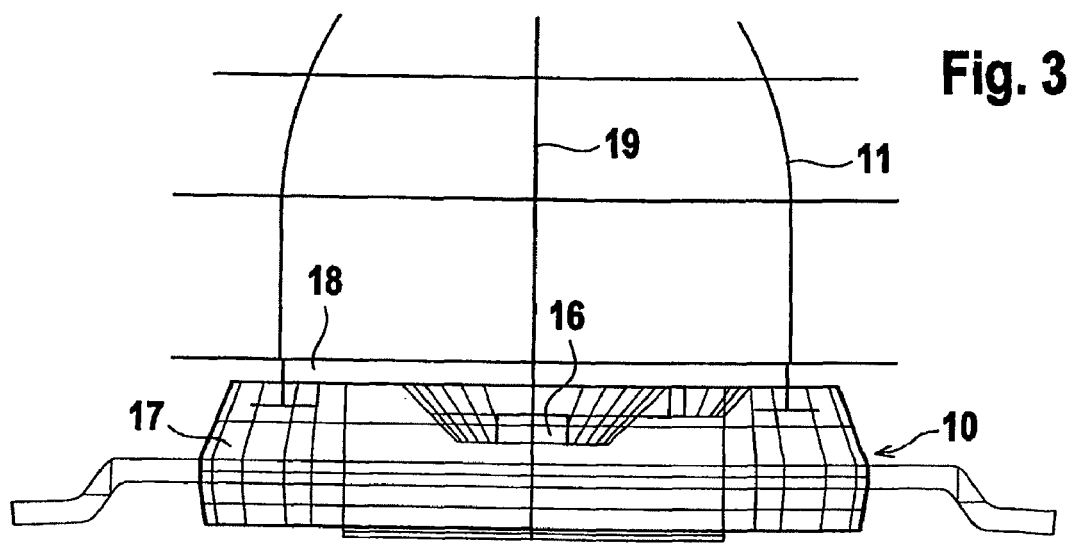
FIG. 3 A representation of a detail for a transmitter with upstream-arranged decoupling lens as component of the illuminating system according to FIG. 2.

FIG. 3 shows a detail of a transmitting unit, comprising a transmitter 10 and a decoupling lens 11. The transmitter 10 is provided with a LED (light-emitting display) chip 16 that emits transmitting light rays and is positioned in a casing for the transmitter 10. The LED chip 16 in this case is positioned inside a recess in the casing 17 that opens up toward the top of the casing 17. The decoupling lens 11 is attached on the top of the casing 17 with the aid of an intermediate adhesive layer 18, consisting of an immersion adhesive. The adhesive layer 18 forms a boundary layer that avoids total reflection of the transmitting light rays during the transition from the LED chip 16 to the decoupling lens 11.

The decoupling lenses 11 are embodied as rotation-symmetrical lenses. Accordingly, the beam cross sections of the transmitting light rays of a LED chip 16 are symmetrical to the optical axis 19 of the LED chip 16 once they pass through the associated decoupling lens 11.

In contrast, the freeform surfaces 14, 15 of the freeform lenses 12, 13, which are installed downstream of the respective transmitting units, are embodied asymmetrical to the optical axis 19 of the respective transmitter 10. As shown in FIG. 1, the asymmetrical structure of the illuminated areas 8 is the result of this type of embodiment of the freeform lenses 12, 13. Adapting the geometries of the freeform surfaces 14, 15 of the freeform lenses 12, 13 furthermore achieves that the detection range is illuminated homogeneously in accordance with the aforementioned required profile.

The invention claimed is:

1. An optical sensor for detecting objects in a detection range, comprising:
    at least one transmitter adapted to emit transmitting light rays,
    at least one receiver adapted to receive receiving light rays,
    an evaluation unit adapted to generate an object detection signal by evaluating the receiving light rays received at the receiver, and
    at least one optical element assigned to the transmitter, the at least one optical element adapted to shape the transmitting light rays into a beam, wherein the at least one optical element comprises at least one freeform boundary surface having a geometry derived based on a differential equation from a brightness distribution to be achieved in a plane of the detection range.

2. The optical sensor according to claim 1, wherein the optical element comprises at least two freeform boundary surfaces.

3. The optical sensor according to claim 1, wherein the optical element comprises a plastic injection-molded component.

4. The optical sensor according to claim 1, wherein the optical element is adapted to shape the transmitting light rays into a beam so as to achieve a homogeneous illumination of the detection range.

5. The optical sensor according to claim 1, wherein the optical element is adapted to shape the transmitting light rays into a beam in order to generate a predetermined illumination pattern.

6. The optical sensor according to claim 1, wherein the sensor comprises a light scanner.

7. The optical sensor according to claim 1, wherein the sensor comprises an image-processing sensor.

8. The optical sensor according to claim 1, further comprising an optical element assigned to the receiver, the optical element assigned to the receiver having at least one freeform surface adapted to shape the receiving light rays into a beam.

9. The optical sensor according to claim 8, wherein the freeform boundary surface is adapted to reflect the transmitting light rays and/or the receiving light rays.

10. The optical sensor according to claim 8, wherein the optical element is adapted to pass the transmitting light rays and/or the receiving light rays through the optical element.

11. The optical sensor according to claim 9, wherein the optical element comprises a mirror element.

12. The optical sensor according to claim 10, wherein the optical element comprises a lens.

13. The optical sensor according to claim 4, wherein the detection range comprises a three-dimensional area.

14. The optical sensor according to claim 4, wherein the detection range comprises a flat surface area.

15. The optical sensor according to claim 7, wherein the receiver comprises a line-type or a matrix-type receiver array.

16. The optical sensor according to claim 7, wherein the sensor comprises a transmitter array that forms an illuminating unit.

17. The optical sensor according to claim 16, further comprising an optical element with a freeform boundary surface assigned to each transmitter.

18. The optical sensor according to claim 16, wherein each transmitter comprises a light-emitting diode positioned inside a casing for the transmitter, and a decoupling lens fitted onto a casing.

19. The optical sensor according to claim 18, wherein the decoupling lens is attached to the casing with an immersion adhesive.

\* \* \* \* \*